United States Patent
Waldman et al.

(10) Patent No.: US 9,514,116 B2
(45) Date of Patent: *Dec. 6, 2016

(54) INTERACTION BETWEEN WEB GADGETS AND SPREADSHEETS

(71) Applicant: Microsoft Technology Licensing, LLC, Redmond, WA (US)

(72) Inventors: Lawrence Waldman, Seattle, WA (US); Keyur Rahul Patel, Seattle, WA (US); Sharar Prish, Redmond, WA (US); Eoin James Burke, Seattle, WA (US); Daniel Battagin, Bellevue, WA (US); Jon Garrett Simmons, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/731,023

(22) Filed: Jun. 4, 2015

(65) Prior Publication Data
US 2015/0347372 A1 Dec. 3, 2015

Related U.S. Application Data

(63) Continuation of application No. 13/289,663, filed on Nov. 4, 2011, now Pat. No. 9,053,083.

(51) Int. Cl.
G06F 17/24 (2006.01)
G06F 9/445 (2006.01)

(52) U.S. Cl.
CPC ......... *G06F 17/246* (2013.01); *G06F 9/44526* (2013.01); *G06F 17/245* (2013.01)

(58) Field of Classification Search
None
See application file for complete search history.

(56) References Cited

U.S. PATENT DOCUMENTS

| 5,212,788 A | 5/1993 | Lomet et al. |
| 5,339,392 A | 8/1994 | Risberg et al. |

(Continued)

FOREIGN PATENT DOCUMENTS

| AU | 2006291313 A1 | 3/2007 |
| CA | 2618224 C | 7/2014 |

(Continued)

OTHER PUBLICATIONS

U.S. Appl. No. 14/920,277, filed Oct. 22, 2015 entitled "System and Method for Providing Calculation Web Services for Online Documents".

(Continued)

*Primary Examiner* — Kyle Stork
*Assistant Examiner* — Asher Kells
(74) *Attorney, Agent, or Firm* — Thomas S. Wong; Micky Minhas (57) ABSTRACT

Gadgets integrate with spreadsheets and the spreadsheet calculation engine. A gadget is bound to a range of cells (one or more) within a sheet. When one or more of the cells of the bound range is accessed (e.g. selected, hovered over, edited, deleted, added), the gadget is notified. The gadget may use this information for updating a display rendered by the gadget and/or performing some other action. The gadget uses an Application Programming Interface (API) to create the binding, communicate with the spreadsheet, and perform actions in the spreadsheet. The gadget is a Named Item object within the spreadsheet such that the gadget may be viewed/displayed differently from other objects. Out of date requests from the gadget are attempted to be detected and prevented from being processed such that the gadget is not acting on the latest data.

20 Claims, 6 Drawing Sheets

(56) References Cited

U.S. PATENT DOCUMENTS

| | | |
|---|---|---|
| 5,371,675 A | 12/1994 | Greif et al. |
| 5,403,639 A | 4/1995 | Belsan et al. |
| 5,418,902 A | 5/1995 | West et al. |
| 5,423,034 A | 6/1995 | Cohen-Levy et al. |
| 5,452,447 A | 9/1995 | Nelson et al. |
| 5,555,403 A | 9/1996 | Cambot et al. |
| 5,581,760 A * | 12/1996 | Atkinson ............... G06F 9/443 |
| | | 707/E17.008 |
| 5,604,854 A | 2/1997 | Glassey |
| 5,613,058 A | 3/1997 | Koppolu et al. |
| 5,664,127 A | 9/1997 | Anderson |
| 5,669,005 A | 9/1997 | Curbow et al. |
| 5,694,608 A | 12/1997 | Shostak |
| 5,708,827 A | 1/1998 | Kaneko et al. |
| 5,727,161 A | 3/1998 | Purcell et al. |
| 5,745,714 A | 4/1998 | Glass et al. |
| 5,819,292 A | 10/1998 | Hitz et al. |
| 5,852,439 A | 12/1998 | Musgrove et al. |
| 5,883,623 A * | 3/1999 | Cseri .................... G06F 3/0481 |
| | | 715/209 |
| 5,890,174 A | 3/1999 | Khanna et al. |
| 5,893,125 A | 4/1999 | Shostak |
| 5,899,988 A | 5/1999 | Depledge et al. |
| 5,978,818 A | 11/1999 | Lin |
| 5,987,481 A | 11/1999 | Michelman et al. |
| 6,003,012 A | 12/1999 | Nick |
| 6,009,455 A | 12/1999 | Doyle |
| 6,023,691 A | 2/2000 | Bertrand et al. |
| 6,038,639 A | 3/2000 | O'Brien et al. |
| 6,097,391 A | 8/2000 | Wilcox |
| 6,157,934 A | 12/2000 | Khan et al. |
| 6,160,549 A | 12/2000 | Touma et al. |
| 6,199,099 B1 | 3/2001 | Gershman et al. |
| 6,216,138 B1 | 4/2001 | Wells et al. |
| 6,247,008 B1 | 6/2001 | Cambot et al. |
| 6,256,651 B1 | 7/2001 | Tuli |
| 6,269,403 B1 | 7/2001 | Anders |
| 6,298,334 B1 | 10/2001 | Burfield et al. |
| 6,360,246 B1 | 3/2002 | Begley et al. |
| 6,460,059 B1 | 10/2002 | Wisniewski |
| 6,484,186 B1 | 11/2002 | Rungta |
| 6,490,593 B2 | 12/2002 | Proctor |
| 6,501,491 B1 | 12/2002 | Brown et al. |
| 6,507,865 B1 | 1/2003 | Hanson et al. |
| 6,578,027 B2 | 6/2003 | Cambot et al. |
| 6,592,626 B1 | 7/2003 | Bauchot et al. |
| 6,613,098 B1 | 9/2003 | Sorge et al. |
| 6,625,603 B1 | 9/2003 | Garg et al. |
| 6,626,959 B1 | 9/2003 | Moise et al. |
| 6,631,497 B1 | 10/2003 | Jamshidi et al. |
| 6,631,498 B1 | 10/2003 | McCauley et al. |
| 6,632,249 B2 | 10/2003 | Pollock |
| 6,651,075 B1 | 11/2003 | Kusters et al. |
| 6,662,341 B1 | 12/2003 | Cooper et al. |
| 6,691,100 B1 | 2/2004 | Dector et al. |
| 6,701,485 B1 * | 3/2004 | Igra ..................... G06F 17/246 |
| | | 715/209 |
| 6,757,867 B2 | 6/2004 | Bauchot et al. |
| 6,775,675 B1 | 8/2004 | Nwabueze et al. |
| 6,801,910 B1 | 10/2004 | Bedell et al. |
| 6,832,351 B1 | 12/2004 | Batres |
| 6,892,211 B2 | 5/2005 | Hitz et al. |
| 6,906,717 B2 | 6/2005 | Couckuyt et al. |
| 6,988,241 B1 | 1/2006 | Guttman et al. |
| 6,990,632 B2 | 1/2006 | Rothchiller et al. |
| 6,993,533 B1 | 1/2006 | Barnes |
| 7,013,312 B2 | 3/2006 | Bala et al. |
| 7,015,911 B2 | 3/2006 | Shaughnessy et al. |
| 7,017,112 B2 | 3/2006 | Collie et al. |
| 7,031,979 B2 | 4/2006 | Kauffman |
| 7,047,380 B2 | 5/2006 | Tormasov et al. |
| 7,231,657 B2 | 6/2007 | Honarvar et al. |
| 7,441,197 B2 | 10/2008 | Tschiegg et al. |
| 7,580,928 B2 | 8/2009 | Wu et al. |
| 7,584,414 B2 | 9/2009 | Mortensen |
| 7,640,496 B1 | 12/2009 | Chaulk et al. |
| 7,650,644 B2 | 1/2010 | Cheng et al. |
| 7,657,571 B2 | 2/2010 | Battagin et al. |
| 7,660,843 B1 | 2/2010 | Atkinson et al. |
| 7,673,340 B1 | 3/2010 | Cohen et al. |
| 7,676,763 B2 | 3/2010 | Rummel |
| 7,680,823 B2 | 3/2010 | Garfinkle et al. |
| 7,730,425 B2 | 6/2010 | De Los Reyes et al. |
| 7,752,536 B2 | 7/2010 | Megiddo et al. |
| 7,908,549 B2 | 3/2011 | Khen et al. |
| 7,949,937 B2 | 5/2011 | Wu et al. |
| 8,245,156 B2 | 8/2012 | Mouilleseaux et al. |
| 8,255,789 B2 | 8/2012 | Berger et al. |
| 8,279,174 B2 | 10/2012 | Jee et al. |
| 8,352,423 B2 | 1/2013 | Phillips et al. |
| 8,381,133 B2 | 2/2013 | Iwema et al. |
| 8,468,444 B2 | 6/2013 | Middelfart |
| 8,549,432 B2 | 10/2013 | Warner |
| 8,566,953 B2 | 10/2013 | Campbell et al. |
| 8,601,389 B2 | 12/2013 | Schulz et al. |
| 9,053,083 B2 | 6/2015 | Waldman et al. |
| 9,171,099 B2 | 10/2015 | Prish et al. |
| 2001/0055013 A1 | 12/2001 | Fuki |
| 2002/0010743 A1 | 1/2002 | Ryan et al. |
| 2002/0015059 A1 | 2/2002 | Clarke |
| 2002/0065846 A1 | 5/2002 | Ogawa et al. |
| 2002/0070953 A1 | 6/2002 | Barg et al. |
| 2002/0077803 A1 | 6/2002 | Kudoh et al. |
| 2002/0077842 A1 | 6/2002 | Charisius et al. |
| 2002/0078086 A1 | 6/2002 | Alden et al. |
| 2002/0099824 A1 | 7/2002 | Bender et al. |
| 2002/0113822 A1 | 8/2002 | Windl et al. |
| 2002/0129054 A1 | 9/2002 | Ferguson et al. |
| 2002/0158887 A1 | 10/2002 | Samra et al. |
| 2002/0184131 A1 | 12/2002 | Gatto |
| 2003/0011638 A1 | 1/2003 | Chung |
| 2003/0018644 A1 | 1/2003 | Bala et al. |
| 2003/0033329 A1 | 2/2003 | Bergman et al. |
| 2003/0044762 A1 | 3/2003 | Bergan et al. |
| 2003/0051209 A1 | 3/2003 | Androski et al. |
| 2003/0061305 A1 | 3/2003 | Copley et al. |
| 2003/0066030 A1 | 4/2003 | Curns et al. |
| 2003/0088586 A1 | 5/2003 | Fitzpatrick et al. |
| 2003/0105765 A1 | 6/2003 | Smith et al. |
| 2003/0120999 A1 | 6/2003 | Miller et al. |
| 2003/0164817 A1 | 9/2003 | Graham et al. |
| 2003/0169295 A1 * | 9/2003 | Becerra, Jr. ........... G06F 3/0481 |
| | | 715/765 |
| 2003/0212960 A1 | 11/2003 | Shaughnessy et al. |
| 2003/0226105 A1 | 12/2003 | Waldau |
| 2003/0233257 A1 | 12/2003 | Matian et al. |
| 2004/0003353 A1 | 1/2004 | Rivera et al. |
| 2004/0006539 A1 | 1/2004 | Royer et al. |
| 2004/0015783 A1 | 1/2004 | Lennon et al. |
| 2004/0064449 A1 | 4/2004 | Ripley et al. |
| 2004/0100501 A1 | 5/2004 | Dornback |
| 2004/0103366 A1 | 5/2004 | Peyton-Jones et al. |
| 2004/0117731 A1 | 6/2004 | Blyashov |
| 2004/0128147 A1 | 7/2004 | Vallinayagam et al. |
| 2004/0143788 A1 | 7/2004 | Aureglia et al. |
| 2004/0168115 A1 | 8/2004 | Bauernschmidt et al. |
| 2004/0174397 A1 | 9/2004 | Cereghini et al. |
| 2004/0181748 A1 | 9/2004 | Jamshidi et al. |
| 2004/0199867 A1 | 10/2004 | Brandenborg |
| 2004/0205595 A1 | 10/2004 | DelGobbo et al. |
| 2004/0205638 A1 | 10/2004 | Thomas et al. |
| 2004/0221233 A1 | 11/2004 | Thielen |
| 2004/0268364 A1 | 12/2004 | Faraj |
| 2005/0039114 A1 | 2/2005 | Naimat et al. |
| 2005/0044496 A1 | 2/2005 | Kotler et al. |
| 2005/0049906 A1 | 3/2005 | Leymann et al. |
| 2005/0068290 A1 | 3/2005 | Jaeger |
| 2005/0097146 A1 | 5/2005 | Konstantinou et al. |
| 2005/0102608 A1 | 5/2005 | Batres |
| 2005/0108052 A1 | 5/2005 | Omaboe |
| 2005/0114661 A1 | 5/2005 | Cheng et al. |
| 2005/0144554 A1 | 6/2005 | Salmon et al. |
| 2005/0165829 A1 | 7/2005 | Varasano |
| 2005/0210389 A1 | 9/2005 | Middelfart |

(56) References Cited

U.S. PATENT DOCUMENTS

| | | | |
|---|---|---|---|
| 2005/0240985 | A1 | 10/2005 | Alkove et al. |
| 2005/0268215 | A1 | 12/2005 | Battagin et al. |
| 2005/0278647 | A1 | 12/2005 | Leavitt et al. |
| 2005/0289136 | A1 | 12/2005 | Wu et al. |
| 2006/0013462 | A1 | 1/2006 | Sadikali |
| 2006/0069696 | A1 | 3/2006 | Becker et al. |
| 2006/0168536 | A1* | 7/2006 | Portmann ............ G06F 9/4443 715/762 |
| 2006/0265641 | A1 | 11/2006 | Garfinkle et al. |
| 2007/0028159 | A1 | 2/2007 | Ying et al. |
| 2007/0050416 | A1 | 3/2007 | Battagin et al. |
| 2007/0061698 | A1 | 3/2007 | Megiddo et al. |
| 2007/0061699 | A1* | 3/2007 | Battagin ............... G06F 17/248 715/209 |
| 2007/0130517 | A1 | 6/2007 | Wu |
| 2007/0136653 | A1 | 6/2007 | Khen et al. |
| 2007/0176898 | A1 | 8/2007 | Suh |
| 2008/0010670 | A1 | 1/2008 | Campbell et al. |
| 2008/0036743 | A1 | 2/2008 | Westerman et al. |
| 2008/0046803 | A1 | 2/2008 | Beauchamp et al. |
| 2008/0235352 | A1 | 9/2008 | Yolleck et al. |
| 2008/0271127 | A1 | 10/2008 | Naibo et al. |
| 2008/0294751 | A1 | 11/2008 | Dreiling |
| 2008/0307385 | A1 | 12/2008 | Dreiling et al. |
| 2009/0083619 | A1 | 3/2009 | Davis |
| 2009/0254572 | A1 | 10/2009 | Redlich et al. |
| 2009/0307623 | A1 | 12/2009 | Agarawala et al. |
| 2009/0309849 | A1 | 12/2009 | Iwema et al. |
| 2009/0327964 | A1 | 12/2009 | Mouilleseaux et al. |
| 2009/0328010 | A1* | 12/2009 | Cao ........................ G06F 8/38 717/139 |
| 2010/0031152 | A1 | 2/2010 | Villaron et al. |
| 2010/0077344 | A1 | 3/2010 | Gaffney et al. |
| 2010/0100854 | A1 | 4/2010 | Russell et al. |
| 2010/0131529 | A1 | 5/2010 | Kasera et al. |
| 2010/0192103 | A1 | 7/2010 | Cragun et al. |
| 2010/0214322 | A1 | 8/2010 | Lim et al. |
| 2010/0262900 | A1 | 10/2010 | Romatier et al. |
| 2010/0318890 | A1 | 12/2010 | Billharz et al. |
| 2011/0145299 | A1 | 6/2011 | Zhou |
| 2011/0145689 | A1* | 6/2011 | Campbell ............. G06F 17/248 715/209 |
| 2011/0154268 | A1 | 6/2011 | Trent et al. |
| 2011/0320563 | A1 | 12/2011 | Seo |
| 2012/0013540 | A1 | 1/2012 | Hogan |
| 2012/0072820 | A1 | 3/2012 | Weinman, Jr. |
| 2012/0180002 | A1 | 7/2012 | Campbell et al. |
| 2012/0221933 | A1 | 8/2012 | Heiney et al. |
| 2012/0254782 | A1 | 10/2012 | Van Ieperen et al. |
| 2012/0330995 | A1 | 12/2012 | Muenkel |
| 2013/0013993 | A1 | 1/2013 | Oh |
| 2013/0061122 | A1 | 3/2013 | Sethi et al. |
| 2013/0117651 | A1 | 5/2013 | Waldman et al. |
| 2013/0159833 | A1 | 6/2013 | Look et al. |
| 2013/0198323 | A1 | 8/2013 | Prish et al. |

FOREIGN PATENT DOCUMENTS

| | | |
|---|---|---|
| CA | 2 618 563 | 5/2015 |
| CN | 1578949 A | 2/2005 |
| CN | 1655120 A | 8/2005 |
| CN | 1877505 A | 12/2006 |
| CN | 101258485 A | 9/2008 |
| CN | 101300564 A | 11/2008 |
| CN | 101326520 A | 12/2008 |
| CN | 101983388 A | 3/2011 |
| EP | 798655 A2 | 10/1997 |
| EP | 0 990 972 A1 | 4/2000 |
| EP | 1367514 A1 | 12/2003 |
| EP | 1603053 A2 | 12/2005 |
| EP | 1922939 A1 | 5/2008 |
| JP | 08500200 A | 1/1996 |
| JP | H11-143606 A | 5/1999 |
| JP | 2001-092444 A | 4/2001 |
| JP | 2001109741 A | 4/2001 |
| JP | 2001312442 A | 11/2001 |
| JP | 2002-140159 A | 5/2002 |
| JP | 2003050964 A | 2/2003 |
| JP | 2003108440 A | 4/2003 |
| JP | 2003281128 A | 10/2003 |
| JP | 2003533755 A | 11/2003 |
| JP | 2004145713 A | 5/2004 |
| JP | 2007-511002 A | 4/2007 |
| JP | 2008-123199 A | 5/2008 |
| JP | 2010-170573 A | 8/2010 |
| KR | 10-2009-0007365 | 1/2009 |
| KR | 10-2009-0013551 | 2/2009 |
| KR | 10-2011-0139649 | 12/2011 |
| MX | 278251 C2 | 5/2010 |
| RU | 2383923 | 3/2010 |
| RU | 2390834 C2 | 5/2010 |
| RU | 2419853 C2 | 5/2011 |
| SG | 117587 A1 | 12/2005 |
| TW | I416342 | 11/2013 |
| TW | I416342 B | 11/2013 |
| WO | 0072197 A2 | 11/2000 |
| WO | 0203595 A2 | 1/2002 |
| WO | WO 02/084531 A2 | 10/2002 |
| WO | 2007032907 A1 | 3/2007 |
| WO | WO 2007/061057 A1 | 5/2007 |
| WO | 2010/065664 A1 | 6/2010 |
| WO | 2010/071630 A1 | 6/2010 |

OTHER PUBLICATIONS

Mexican Office Action cited in Appl No. MX/a/2008/003318, dated Aug. 17, 2010, 3 pgs.
Mexican Office Action dated Jul. 14, 2010, cited in Appl No. MX/a/2008/002501; 4 pgs.
Russian Office Action dated Sep. 6, 2010, cited in Appln No. 2008108999; 5 pgs.
Australian Examination Report dated Oct. 29, 2010 cited in Appln No. 2006287357 2 pgs.
Mexican Office Action dated Dec. 8, 2010, cited in Appl No. MX/a/2008/003318; 8 pgs.
New Zealand Examination Report dated Jan. 20, 2011 cited in Appln No. 566309 2 pages.
Japanese Notice of Rejection dated Feb. 3, 2012 cited in Appln No. 2008-530243; 9 pgs.
European Search Report dated Feb. 27, 2012 in Appl No. PCT/US2006/034312; 12 pgs.
Korean Preliminary Rejection dated Jan. 13, 2013 in Appln No. 10-2008-7004303; 13 pgs.
Mexican Office Action dated May 6, 2013, cited in Appl No. MX/a/2008/003318; 15 pgs.
Malaysia Substantive Examination Report dated Jan. 15, 2014 in Appln No. PI 20080503, 3 pgs.
Malaysian Notice of Allowance dated Jun. 13, 2014 in Appln No. PI 20080500, 2 pgs.
Malaysia Modified Substantive Examination Report dated Feb. 13, 2015 in Appln No. PI 20080396, 2 pgs.
Chinese Third Office Action and Search Report Issued in Patent Application No. 201210012142.0, Mailed Date: May 18, 2015, 13 Pages.
EP Extended Search Report dated Jul. 16, 2015 in Appln No. PCT/US2012/063133, 9 pgs.
EP Extended Search Report dated Sep. 22, 2015 in Appln No. PCT/US2013/022824, 8 pgs.
Author Unknown, Using GoogleFinance to Track Stocks on the Australian Securities Exchange (ASX); Ben's Blog: Sep. 18, 2010; 2 pgs.
Author Unknown, "Use Online Data in Excel 2010 Spreadsheets—How to Geek"; Jan. 6, 2012; Retrieved from http://web.archive.org/web/201020106083121/haap://howtogeek.com/howto/24285/use-online-data-in-excel-2010-spreadsheets; 6 pgs.
Author Unknown, "Trade Like a Geek—One Click Stock Quotes in Excel—Learn How to Learn Excel"; 2009 Pointy Haired Dilbert—Chandoo.org; 6 pgs.

(56) References Cited

OTHER PUBLICATIONS

Brain Matter [Online], AlphaBlox, Jul. 22, 2001 [Retrieved on Sep. 7, 2006]. Retrieved from <URL:http://web.archive.org/ web/20010818124342/www.blox.com/products?subsection=spreadhseets>; 1 pg.

Walkenbach, John.; "Microsoft Office Excel 2007"; Chapters 15, 27, 40; Excel 2007 Bible; Wiley Publishing; 44 pgs.

"WP01:WebSphere MQ Workflow-Performance Estimates and Capacity Assessments", http://www.1.ibm.com/suggort/docview.wss?rs=171 &uid=swg24006573&I0c=enUS&cs=ytu-8&lang=en, 2 pgs.

Office Action dated Sep. 15. 2010, issued in U.S. Appl. No. 11/223,541, 21 pages.

Office Action dated Oct. 7, 2011, issued in U.S. Appl. No. 11/223,541, 27 pages.

Office Action dated Nov. 8, 2011, issued in U.S. Appl. No. 11/860,394, 20 pgs.

Office Action dated Apr. 30, 2012, issued in U.S. Appl. No. 11/223,541; 35 pgs.

Office Action dated Sep. 25, 2012, issued in U.S. Appl. No. 11/223,541, 35 pages.

Office Action dated Feb. 13, 2013, issued in U.S. Appl. No. 13/289,663, 15 pages.

Office Action dated Apr. 22, 2013, issued in U S. Appl. No. 11/223,541, 33 pages.

Office Action dated Nov. 6, 2013, issued in Appl. No. 13/289,663, 15 pages.

Office Action dated May 22, 2014, issued in U.S. Appl. No. 13/035,689, 60 pgs.

Office Action dated Jul. 7, 2014, issued in U.S. Appl. No. 11/223,541 26 pgs.

Office Action dated Nov. 19, 2014, issued in U.S. Appl. No. 13/035,689, 31 pgs.

Notice of Allowance dated Jun. 25, 2015, issued in U.S. Appl. No. 13/570,071, 22 pgs.

Office Action dated Sep. 23, 2015 issued in U.S. Appl. No. 13/035,689, 38 pgs.

Office Action dated Sep. 24, 2015, issued in U.S. Appl. No. 12/986,473, 26 pgs.

Malaysia Substantive Examination Report dated Jul. 15, 2015 in Appln No. PI 20080503, 2 pgs.

India First Examination Report dated Sep. 30, 2015 cited in 1943/DELNP/2008, 3 pgs.

India First Examination Report dated Oct. 9. 2015 cited in 1575/DELNP/2008, 3 pgs.

Chinese Notice of Grant dated Nov. 27, 2015 in Appln No. 201210012142.0, 4 pgs.

Chinese Third Office Action Issued in Patent Application No. 201210434821.7, Mailed Date: Dec. 17, 2015, 10 Pages.

Russian Office Action dated Dec. 18, 2015 in Appln No. 2412-197167, 5 pgs.

Office Action dated Mar. 26, 2015 issued in U.S. Appl. No. 13/035,689, 24 pgs.

"Office Action Issued in U.S. Appl. No. 11/223,541", Mailed Date: Sep. 15, 2010, 21 Pages.

"Office Action Issued in U.S. Appl. No. 11/223,541", Mailed Date: Jun. 23, 2011, 23 Pages.

"Office Action Issued in U.S. Appl. No. 11/223,541", Mailed Date: Mar. 2, 2011, 23 Pages.

"Office Action Issued in U.S. Appl. No. 11/223,541", Mailed Date: Jul. 7, 2014, 26 Pages.

"Office Action Issued in U.S. Appl. No. 11/223,541", Mailed Date: Oct. 7, 2011, 27 Pages.

"Office Action Issued in U.S. Appl. No. 11/223,541", Mailed Date: Apr. 22, 2013, 33 Pages.

"Office Action Issued in U.S. Appl. No. 11/223,541", Mailed Date: Apr. 30, 2012, 35 Pages.

"Office Action Issued in U.S. Appl. No. 11/223,541", Mailed Date: Sep. 25, 2012, 33 Pages.

"Office Action Issued in U.S. Appl. No. 11/223,541", Mailed Date: Dec. 20, 2013, 34 Pages.

"Office Action Issued in U.S. Appl. No. 11/298,380", Mailed Date: Mar. 30, 2009, 14 Pages.

"Office Action Issued in U.S. Appl. No. 11/298,380", Mailed Date: Mar. 2, 2010, 12 Pages.

"Office Action Issued in U.S. Appl. No. 11/298,380", Mailed Date: Sep. 14, 2009, 15 Pages.

"Office Action Issued in U.S. Appl. No. 11/860,394", Mailed Date: Dec. 8, 2010, 16 Pages.

"Office Action Issued in U.S. Appl. No. 11/860,394", Mailed Date: Jun. 17, 2011, 17 Pages.

"Office Action Issued in U.S. Appl. No. 11/860,394", Mailed Date: Nov. 8, 2011, 17 Pages.

"Office Action Issued in U.S. Appl. No. 11/860,394", Mailed Date: Apr. 20, 2012, 20 Pages.

"Non-Final Office Action Issued in U.S. Appl. No. 12/986,473", Mailed Date: May 8, 2014, 17 Pages.

"Office Action Issued in U.S. Appl. No. 12/986,473", Mailed Date: Dec. 24, 2014, 17 Pages.

"Supplementary Search Report Issued in European Patent Application No. 12845776.9", Mailed Date: Jul. 16, 2015, 8 Pages.

"First Examination Report Issued in Indian Patent Application No. 1286/DEL/2005", Mailed Date: Jan. 22, 2014, 2 Pages.

"Office Action Issued in U.S. Appl. No. 13/035,689", Mailed Date: Nov. 19, 2014, 23 Pages.

"Office Action Issued in U.S. Appl. No. 13/035,689", Mailed Date: May 22, 2014, 24 Pages.

"Office Action Issued in U.S. Appl. No. 13/035,689", Mailed Date: Mar. 26, 2015, 24 Pages.

"Final Office Action Issued in U.S. Appl. No. 13/289,663", Mailed Date: Nov. 6, 2013, 15 Pages.

"Non-Final Office Action Issued in U.S. Appl. No. 13/289,663", Mailed Date: Feb. 13, 2013, 15 Pages.

"Notice of Allowance Issued in U.S. Appl. No. 13/289,663", Mailed Date: May 13, 2015, 2 Pages.

"Notice of Allowance Issued in U.S. Appl. No. 13/289,663", Mailed Date: Feb. 6, 2015, 9 Pages.

"Office Action Issued in U.S. Appl. No. 13/570,071", Mailed Date: Oct. 8, 2014, 14 Pages.

"Office Action Issued in U.S. Appl. No. 13/570,071", Mailed Date: Mar. 24, 2014, 13 Pages.

"Office Action Issued in Canadian Patent Application No. 2,618,211", Mailed Date: Dec. 17, 2012, 2 Pages.

"Notice of Allowance Issued in Canadian Patent Application No. 2618224", Mailed Date: Apr. 3, 2014, 2 Pages.

"Office Action Issued in Canadian Patent Application No. 2,618,224", Mailed Date: May 13, 2013, 4 Pages.

"Australian Examination Report Issued in Patent Application No. SG 200503164-6", Mailed Date: May 29, 2007, 6 Pages.

"Australian Examination Report Issued in Patent Application No. 2006284595", Mailed Date: Oct. 22, 2009, 3 Pages.

"Australian Examination Report Issued in Patent Application No. 2006287357", Mailed Date: Oct. 29, 2010, 2 Pages.

"Australian Examination Report Issued in Patent Application No. 2006291313", Mailed Date: Oct. 26, 2010, 2 Pages.

"Office Action Issued in Chinese Patent Application No. 200680031441.1", Mailed Date: Jul. 24, 2009, 11 Pages.

"Second Office Action Issued in Chinese Patent Application No. 200680031441.1", Mailed Date: Feb. 5, 2010, 7 Pages.

"Office Action Issued in Chinese Patent Application No. 200680032787.3", Mailed Date: May 22, 2009, 5 Pages.

"Second Office Action Issued in Chinese Patent Application No. 200680032787.3", Mailed Date: Nov. 13, 2009, 5 Pages.

"Office Action Issued in Russian Patent Application No. 2008107762", Mailed Date: Jul. 29, 2010, 4 Pages. (W/O English Translation).

"Office Action Issued in Russian Patent Application No. 2008108992", Mailed Date: Sep. 22, 2010, 5 Pages. (W/O English Translation).

"Office Action Issued in Russian Patent Application No. 2008108999", Mailed Date: Sep. 6, 2010, 4 Pages.

(56) References Cited

OTHER PUBLICATIONS

"Notice of Rejection Issued in Japanese Patent Application No. 2008-529328", Mailed Date: Apr. 22, 2011, 7 Pages.
"Final Notice of Rejection Issued in Japanese Patent Application No. 2008-530095", Mailed Date: Dec. 7, 2012, 4 Pages.
"Notice of Rejection Issued in Japanese Patent Application No. 2008-530095", Mailed Date: Jan. 31, 2012, 6 Pages.
"Notice of Rejection Issued in Japanese Patent Application No. 2008-530243", Mailed Date: Feb. 3, 2012, 9 Pages.
"Office Action & Search Report Received for Chinese Patent Application No. 201210012142.0", Mailed Date: Jan. 6, 2014, 10 Pages.
"Second Office Action Issued in Chinese Patent Application No. 201210012142.0", Mailed Date: Nov. 4, 2014, 6 Pages.
"First Office Action and Search Report Issued in Chinese Patent Application No. 201210434821.7", Mailed Date: Oct. 27, 2014, 13 Pages.
"Second Office Action Issued in Chinese Patent Application No. 201210434821.7", Mailed Date: Jun. 19, 2015, 8 Pages.
"Examination Report Issued in New Zealand Patent Application No. 566309", Mailed Date: Jan. 20, 2011, 2 Pages.
"Examination Report Issued in New Zealand Patent Application No. 566309", Mailed Date: May 5, 2011, 3 Pages.
"Examination Report Issued in New Zealand Patent Application No. 594997", Mailed Date: Sep. 9, 2011, 2 Pages.
"Further Examination Report Issued in New Zealand Patent Application No. 594997", Mailed Date: Dec. 14, 2012, 2 Pages.
"Notice of Allowance Issued in Taiwan Patent Application No. 95132059", Mailed Date: Jul. 30, 2013, 4 Pages.
"Office Action Issued in Mexican Patent Application No. MX/a/20081002501", Mailed Date: Jun. 21, 2010, 2 Pages. (W/O English Translation).
"Office Action Issued in Mexican Patent Application No. MX/a/2008/003309", Mailed Date: Feb. 11, 2013, 7 Pages.
"Office Action Issued in Mexican Patent Application No. MX/a/2008/003309", Mailed Date: Oct. 4, 2011, 4 Pages.
"Office Action Issued in Mexican Patent Application No. MX/a/2008/003318", Mailed Date: Aug. 17, 2010, 3 Pages.
"Office Action Issued in Mexican Patent Application No. MX/a/2008/003318", Mailed Date: Apr. 27, 2012, 10 Pages.
"Office Action Issued in Mexican Patent Application No. MX/a/2008/003318", Mailed Date: Apr. 11, 2013, 6 Pages.
"Office Action Issued in Mexican Patent Application No. MX/a/2008/003318", Mailed Date: Dec. 15, 2011, 6 Pages.
"International Search Report and Written Opinion Issued in PCT Patent Application No. PCT/US06/33800", Mailed Date: Jan. 8, 2007, 5 Pages.
"International Preliminary Report on Patentability Issued in PCT Application No. PCT/US12/63133", Mailed Date: May 6, 2014, 5 Pages.
"International Search Report and Written Opinion Issued in PCT Patent Application No. PCT/US12/63133", Mailed Date: Mar. 22, 2013, 9 Pages.
"European Search Report Issued in European Patent Application No. PCT/US2006/034312", Mailed Date: Mar. 6, 2012, 12 Pages.
"International Search Report Issued in PCT Patent Application No. PCT/US2006/034312", Mailed Date: Jan. 9, 2007, 4 Pages.
"International Search Report and Written Opinion Issued in PCT Patent Application No. PCT/US2012/026672", Mailed Date: Oct. 25, 2012, 11 Pages.
"International Search Report and Written Opinion Issued in PCT Patent Application No. PCT/US2013/022824", Mailed Date: May 30, 2013, 10 Pages.
"Malaysia Modified Substantive Examination Report Issued in Patent Application PI 20080396", Mailed Date: Feb. 13, 2015, 2 Pages.
"Modified Substantive Examination Report Issued in Malaysian Patent Application No. PI 20080396", Mailed Date: Aug. 15, 2014, 2 Pages.
"Notice of Allowance Issued in Malaysian Patent Application No. PI 20080500", Mailed Date: Jun. 13, 2014, 2 Pages.
"Malaysia Substantive Examination Report Issued in Patent Application No. PI 20080503", Mailed Date: Jan. 15, 2014, 3 Pages.
XESS The Advanced X Windows Spreadsheet System, Published on: Mar. 19, 2013, Available at: https://web.archive.org/web/20130319004126/http://ais.com/Xess/xess5_product_sheet.html.
"About Dynamic Data Exchange", Retrieved on : Jan. 11, 2012, Available at: http://web.archive.org/web/20140215195143/http://msdn.microsoft.com/en-us/library/windows/desktop/ms648774 (v=vs.85).aspx.
"Add-Ins Turn App Docs Into Web Pages: Microsoft Internet Assistant Tools", In Windows Magazine, vol. 7, Issue 6, Jun. 1, 1996, 2 Pages.
"Brain Matter", Published on: Apr. 5, 2001, Available at: http://web.archive.org/web/20010405152714/www.blox.com/?id=sheet.
"Cologo: A Collaborative Web-based Programming Environment", Published on: Sep. 20, 2011, Available at: http://www.cologo-lang.org/docs_starting.html.
"Data Warehouse Trend, Part 2 OLAP is Enabled on WWW Browser, Formulation/Operation of Data Warehouse Becomes Easy and Enlargement of User Target is Accelerated", In NIKKEI Computer, No. 440, Business Publications, Inc., Japan, Mar. 30, 1998, (English copy not Available)
"Getting Started with Spreadsheets Gagdets", Published on: Oct. 20, 2011, Available at: http://web.archive.org/web/20120414071336/http://code.google.com/apis/spreadsheets/gadgets/.
"How to: Save a Workbook as a Web Page in Excel 2002", Published on: Jun. 29, 2010, Available at: http://support.microsoft.com/default.aspx?scid=kb;us;289260.
"Investing in Better Time & Expense Gathering", In White Paper, Jun. 2005, 12 Pages.
Kirchner, Jake, "Skinny Clients to Rule on Web-Corporate Intranets Will Fuel a New Breed of Applications", In PC Magazine, vol. 15, Issue 6, Mar. 26, 1996, 1 Page.
"Welcome to Gnumeric!", Published on: Jun. 29, 2010, Available at: https://web.archive.org/web/20100625170027/http://projects.gnome.org/gnumeric/.
"WP01 :WebSphere MQ Workftow-Performance Estimates and Capacity Assessments", Published on: Oct. 5, 2005 Available at: http://www-1.ibm.com/support/docview.wss?rs=171 &uid=swg24006573&loc=en_US&cs.
Andrews, et al., "Liquid Diagrams:lnformation Visualisation Gadgets", In Proceedings of 14th International Conference on Information Visualisation, Jul. 26, 2010, pp. 104-109.
Battagin, "Using Excel Web Services in a SharePoint Web Part", Published on: Nov. 2006, Available at: http://msdn.microsoft.com/en-us/library/aa973804%28v=office.12%29.aspx.
Blattner, Patrick , "Special Edition Using Microsoft Excel 2003", Published on: Sep. 8, 2010, Available at: http://proquest.safaribooksonline.com/0-7897-2953-9.
Curie, D ,"The Medium Is The Message: Data Downlink's.xls Lets Number Stay Numbers", Online,vol. 21, Issue 6, Nov. 1997, pp. 64-66.
Dodge, et al., "Microsoft Office Excel 2003", Official Manual, the First Edition, Nikkei BP Soft Press, Inc., Jul. 12, 2004, pp. 129-135 and 387-392.
Entology, "Large Diversified Manufacturer Achieves Sarbanes-Oxley Compliance Through Financial Document Management", Published on: 2003, Available at: https://web.archive.org/web/20071103094335/http://www.entology.com/press/cs/cs_029.htm.
Fox, "How to Convert a Google Spreadsheet into JSON, XML, and MySQL", Published on: May 17, 2009, Available at: http:/blog.pamelafox.org/2009/05/how-to-convert-google-spreadsheet-into.html.
Granet, Vincent, "The Xxl Spreadsheet Project", In Linux Journal, 1999, Sep. 21, 2005, 11 Pages.
Hudson, Scott E. "User Interface Specification Using an Enhanced Spreadsheet Model", In ACM Transactions on Graphics, vol. 13, Issue 3, Jul. 1994, pp. 209-239.

(56) References Cited

OTHER PUBLICATIONS

Huynh, D., "Timeline Gadget for Google Spreadsheets", Retrieved on: Sep. 20, 2011, Available at: http://s3.amazonaws.com/iac-production/attachments/28/TimeLine_Gadget_for_Google_Spreadsheets.pdf.

Jones, "A User-Centred Approach to Functions in Excel", In ICEP, 2003, pp. 165-176.

Khor, Stew Mol, "Microsoft Office Excel 2003 Preview", In Microsoft Office Excel 2003 Preview, Microsoft Excel 2003 Technical Articles, Microsoft Corporation Publishing, Jun. 2003, 19 Pages.

Lai, et al., "Object Lens: A Spreadsheet for Cooperative Work; Abstract", In ACM Transactions on Information Systems,vol. 6, Issue 4, Sep. 1988, 42 Pages.

Loney, et al., "An Overview of Databases and Instances", In: Oracle Database 10g DBA Handbook, Mar. 24, 2005, 2 Pages.

Loney, et al., "Dynamic Data Replication", In: Oracle Database 10g DBA Handbook, Mar. 24, 2005, 2 Pages.

Loney, et al., "Oracle Logical Database Structures", In: Oracle Database 10g DBA Handbook, Mar. 24, 2005, 16 Pages.

Loney, et al., "Overview of Oracle Net", In: Oracle Database 10g DBA Handbook, Mar. 24, 2005, 12 Pages.

McManus, "Excel Everywhere for HTML: Transform Static Excel Spreadsheets Into Smart Interactive Web Pages", In Internet Magazine, No. 115, Mar. 2004, 3 Pages.

McPherson, "Serializing Excel Data for Input to any Google Visualization", Published on: Jan. 26, 2011, Available at: http://www.nullskull.com/a/1586/serializing-excel-data-for-input-to-any-google-visualization.aspx.

Oliver, et al., "POI-HSSF and POI-XSSF—Java API to Access Microsoft Excel Format Files", Retrieved Date: Jan. 11, 2012, Available at: https://poi.apache.org/spreadsheet/.

Person, R., "Creating Charts", In Special Edition Using Microsoft Excel '97, 1997, pp. 385-410.

Quixa, "Builder/Quixa Solutions", Published on: 2005, Available at: http://www.guixa.com/ultinnus/builder.asp.

Smedley, et al., "Expanding the Utility of Spreadsheets Through The Integration of Visual Programming and User Interface Objects", In Proceedings of the Workshop on Advanced Visual Interfaces, 1996, pp. 148-155.

Stinson, C., "Microsoft Office Excel 2003", In Microsoft Press, Sep. 3, 2003, pp. 1-7.

Truve, Staffan, "Dynamic What-If Analysis: Exploring Computational Dependencies With Slidercells and Micrographs", In Conference Companion on Human Factors in Computing Systems, May 7, 1995, pp. 280-281.

Zhao, Jensen J., "Developing Web-Enabled Interactive Financial Tools Without HTML and Script Languages", In Information Technology, Learning, and Performance Journal, Fall 2001, vol. 19, No. 2, 2001, 5 Pages.

Excel Essential Toolbox: Fun for Only a Three-Month Mortgage, Published on: Jan. 25, 2010, http://article.pchome.net/content-1047708-all.html.

"Preliminary Rejection Issued in Korean Patent Application No. 10-2008-7004303", Mailed Date: Jan. 28, 2013, 13 Pages.

"European Search Report Issued in European Patent Application No. 05104560", Mailed Date: Aug. 21, 2007, 3 Pages.

"Office Action Issued in U.S. Appl. No. 11/214,676", Mailed Date: Jun. 1, 2009, 12 Pages.

"Office Action Issued in U.S. Appl. No. 11/214,676", Mailed Date: Nov. 21, 2008, 12 Pages.

"Office Action Issued in U.S. Appl. No. 11/214,676", Mailed Date: Jan. 8, 2008, 13 Pages.

"Office Action Issued in U.S. Appl. No. 11/214,676", Mailed Date: Jul. 2, 2008, 13 Pages.

"Office Action Issued in U.S. Appl. No. 11/223,180", Mailed Date: Nov. 26, 2008, 15 Pages.

"Office Action Issued in U.S. Appl. No. 11/223,180", Mailed Date: Apr. 23, 2009, 18 Pages.

"Office Action Issued in U.S. Appl. No. 11/223,180", Mailed Date: Sep. 1, 2009, 16 Pages.

"Office Action Issued in U.S. Appl. No. 11/223,541", Mailed Date: Nov. 19, 2008, 7 Pages.

"Office Action Issued in U.S. Appl. No. 11/223,541", Mailed Date: May 26, 2009, 13 Pages.

"Office Action Issued in U.S. Appl. No. 11/223,541", Mailed Date: Jan. 20, 2010, 14 Pages.

Australian Office Action in Application 2012204477, mailed Apr. 24, 2016, 3 pgs.

Author Unknown, Using GoogleFinance to Track Stocks on the Australian Securities Exchange (ASX); Ben's Blog; Sep. 18, 2010; 2 pgs.

Blattner et al, "Special Edition Using Microsoft Excel2000", May 3, 1999, Que, pp. 1-13.

Chilean Office Action cited in Appln No. 1155-2005 dated Jan. 16, 2008, 10 pgs.

Chilean Second Office Action cited in Appln No. 1155-2005 dated Jun. 23, 2009, 8 pgs.

Chilean Third Office Action cited in Appln No. 1155-2005 dated Jun. 8, 2010, 11 pgs.

Chinese 1st Office Action in Application 201210044546.8, mailed Feb. 24, 2016, 12 pgs.

Chinese Office Action and Search Report Issued in Patent Application No. 201380007011.6, Mailed Date: Feb. 3, 2016, 12 Pages.

Chinese Office Action cited in Appln No. 200510075819.5 dated Dec. 14, 2007, 17 pgs.

Chinese Second Office Action cited in Appln No. 200510075819.5 dated May 30, 2008, 18 pgs.

Chinese Third Office Action cited in Appln No. 200510075819.5 dated Nov. 7, 2008, 8 pgs.

European Communication in Application 14736166.1, mailed Jan. 22, 2016, 2 pgs.

European Search Report dated Mar. 6, 2012 in Appl No. 06790149.6, 12 pgs.

Indian Exam Report in Application 1981/DELNP/2008, mailed Apr. 18, 2016, 7 pgs.

International Search Report dated Jan. 8, 2007, issued in PCT Application No. PCT/US2006/033800; 2 pgs.

International Preliminary Report on Patentability Issued for PCT Patent Application No. PCT/US2014/041258, Mailed Date: Aug. 31, 2015, 8 Pages.

International Search Report and Written Opinion for International Application No. PCT/US2012/026672 mailed Oct. 25, 2012, 11 pgs.

International Search Report and Written Opinion Issued for PCT Patent Application No. PCT/US2014/041258, Mailed Date: Feb. 18, 2015, 10 Pages.

International Search Report and Written Opinion Issued for PCT Patent Application No. PCT/US2014/041258, Mailed Date: Jun. 12, 2015, 7 Pages.

Israeli Office Action cited in Appln No. 168621 dated Sep. 22, 2009, 2 pgs.

iWork for iOS—Numbers—Innovative spreadsheets in a few taps, Retrieved on: Apr. 26, 2013, Available at: https://movies.apple.com/ca/apps/iwork/numbers/, 9 pgs.

iWork—Numbers—Create perfect spreadsheets in minutes., Retrieved on: Apr. 26, 2013, Available at: http://www.apple.com/in/iwork/numbers/#spreadsheet, 3 pgs.

Japanese Notice of Rejection in Appln No. 2005-161 206 dated Oct. 22, 2010.

Japanese Notice of Rejection Issued in Patent Application No. 2013-548479, Mailed Date: Jan. 26, 2016, 9 Pages.

Loney et al., "Overview of Oracle Net"; In: Oracle Database 1 Og OBA Handbook, Mar. 24, 2005; Oracle Press; 12 pgs.

Malaysian Office Action cited in Appln No. PI 20052416, dated Sep. 15, 2010, 3 pgs.

Mexican Second Office Action cited in Appl No. PNa/2005/005855, dated Nov. 18, 2009, 2 pgs.

New Zealand Examination Report cited in Appln No. 540420 dated Jun. 7, 2005, 2 pgs.

Office Action dated Apr. 7, 2009, issued in U.S. Appl. No. 10/858,188, 25 pgs.

(56) References Cited

OTHER PUBLICATIONS

Office Action dated Feb. 20, 2008, issued in U.S. Appl. No. 10/858,188, 19 pgs.
Office Action dated Jul. 6, 2007, issued in U.S. Appl. No. 10/858,188.
Office Action dated May 15, 2006, issued in U.S. Appl. No. 10/858,188, 19 pgs.
Office Action dated Nov. 21, 2006, issued in U.S. Appl. No. 10/858,188, 19 pgs.
Office Action dated Oct. 29, 2008, issued in U.S. Appl. No. 10/858,188, 26 pgs.
PCT International Preliminary Report on Patentability Issued in PCT Application No. PCT/US2013/022824, Mailed Date: Aug. 7, 2014, 6 Pages.
Pembudon et al., XHTML 1.0: The Extensible Hypertext Markup Language, A Reformulation ofHTML-4.0 in XML 1.0, W3C Working Draft, May 5, 1999, http://www.w3.org/TR/1999/xhtml1-199990505/, 16 pgs.
Russian Office Action cited in Appln No. 2005116667 dated Apr. 24, 2009, 4 pgs.
U.S. Appl. No. 12/986,473, Office Action mailed Jun. 2, 2016, 16 pgs.
U.S. Appl. No. 13/918,914, Office Action mailed Apr. 6, 2016, 22 pgs.
U.S. Appl. No. 13/918,914, Office Action mailed Jun. 8, 2016, 19 pgs.
European Office Action in Application 06790149.6, mailed May 17, 2016, 6 pgs.
Chinese 4th Office Action in Application 201210434821.7, mailed Jun. 22, 2016, 13 pgs.
U.S. Appl. No. 13/035,689, Office Action mailed Jul. 1, 2016, 30 pgs.
Chinese 2nd Office Action in Application 201210044546.8, mailed Aug. 2, 2016, 13 pgs.

* cited by examiner

INTERACTION BETWEEN WEB GADGETS AND SPREADSHEETS

CROSS-REFERENCE TO RELATED APPLICATIONS

This application is a continuation application, and claims priority to U.S. patent application Ser. No. 13/289,663 (now U.S. Pat. No. 9,053,083), filed Nov. 4, 2011, entitled "INTERACTION BETWEEN WEB GADGETS AND SPREADSHEETS," which application is incorporated herein by reference in its entirety.

BACKGROUND

Spreadsheets are used for many different purposes, such as analyzing, managing, and sharing information. For example, a user may configure visualization tools to help the track and highlight important data trends. Many users and businesses attempt to add custom functionality to a spreadsheet application but programming these additions can be difficult and limited to the functionality exposed by the spreadsheet application.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Gadgets integrate with spreadsheets and the spreadsheet calculation engine. A gadget can be bound to a range of cells (one or more) and/or to an object within a sheet. For explanatory purposes, the term "bound to a range of cells" includes bound to at least one of: a cell and an object within the spreadsheet. When one or more of the cells of the bound range is accessed (e.g. selected, hovered over, edited, deleted, added), the gadget can be notified by an application programming interface (API) or other system. The gadget may use this information for updating a display rendered by the gadget and/or performing some other action. The gadget may render data obtained from the spreadsheet while the spreadsheet application protects the backend logic and calculation details in the spreadsheet itself to any unauthorized users viewing the gadget. The gadget uses an Application Programming Interface (API) to create the binding, communicate with the spreadsheet, and perform actions in the spreadsheet. The gadget can be a Named Item object within the spreadsheet such that the gadget may be viewed/displayed differently from other objects (e.g. selected for publication in a report, dashboard, ... ). Some implementations of gadgets will attempt to detect and prevent out of date requests from being made such that the gadget or spreadsheet application are not acting on the latest data.gad-getgadget.

DETAILED DESCRIPTION

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
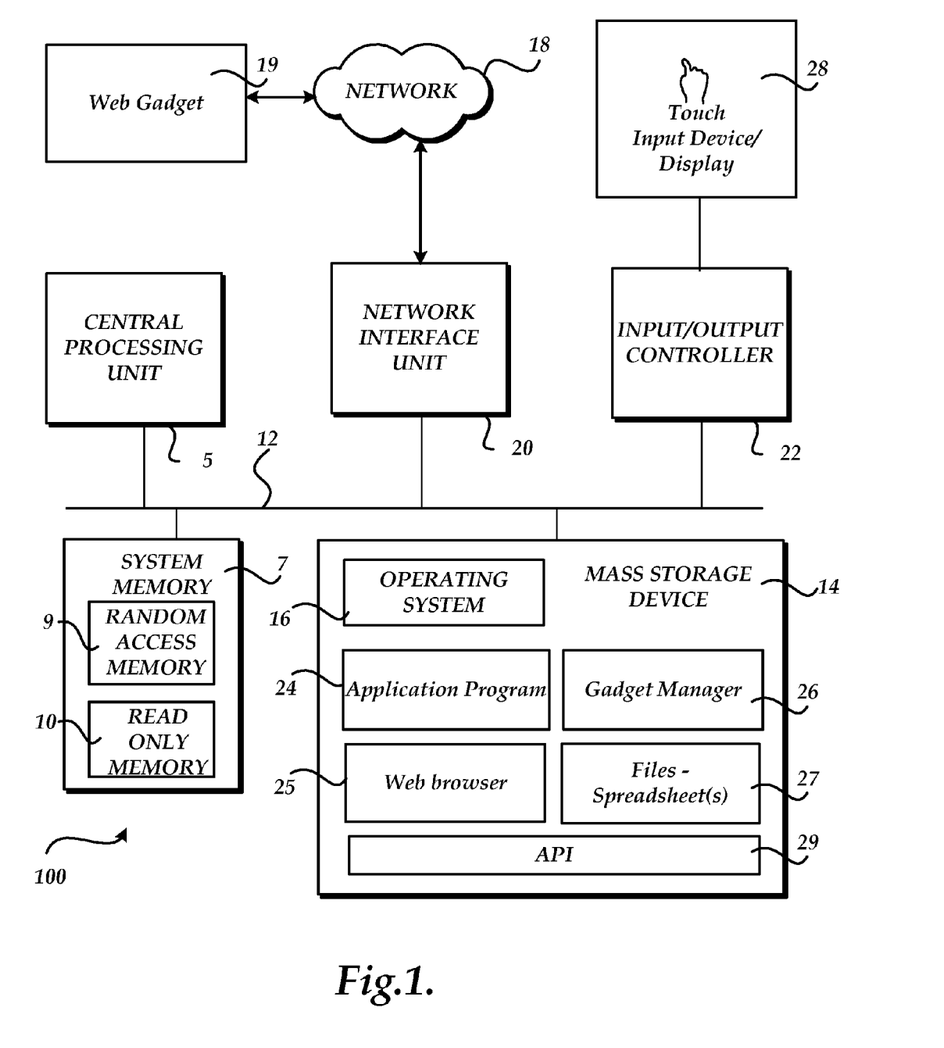
FIG. 1 illustrates an exemplary computing device.

Referring now to FIG. 1, an illustrative computer architecture for a computer 100 utilized in the various embodiments will be described. The computer architecture shown in FIG. 1 may be configured as a mobile computing device (e.g. smartphone, notebook, tablet ... ) or desktop computer and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application program (s) 24 such as a spreadsheet application and/or other application that works with tabular data, Web browser 25, files 27 (e.g. spreadsheets) and gadget manager 26 which will be described in greater detail below. The Web browser 25 is operative to request, receive, render, and provide interactivity with electronic content, such as Web pages, videos, documents, and the like. According to an embodiment, the Web browser comprises the INTERNET EXPLORER Web browser application program from MICROSOFT CORPORATION.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a touch input device 28. The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device 28 may also act as a display. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, may be integrated with other components of the computing device/system 100 on the single integrated circuit (chip).

As mentioned briefly above, a number of program modules and data files may be stored in the mass storage device 14 and RAM 9 of the computer 100, including an operating system 16 suitable for controlling the operation of a networked personal computer, such as the WINDOWS 7® operating system from MICROSOFT CORPORATION of Redmond, Wash. According to one embodiment, the operating system is configured to include support for touch input device 23. According to another embodiment, gadget manager 26 may be utilized to process some/all of the touch input that is received from touch input device 28.

The mass storage device 14 and RAM 9 may also store one or more program modules. In particular, the mass storage device 14 and the RAM 9 may store one or more application programs 24, such as a spreadsheet application. According to an embodiment, the spreadsheet application is MICROSOFT EXCEL. In conjunction with the operation of the application, gadget manager 26 is used to integrate one or more gadgets with a spreadsheet. Gadget manager 26 may be configured as an application/process and/or as part of a cloud based multi-tenant service that provides resources (e.g. services, data . . . ) to different tenants (e.g. MICROSOFT OFFICE 365, MICROSOFT SHAREPOINT ONLINE).

Generally, gadget manager 26 is configured to process input and calls that include a gadget and a spreadsheet. The gadgets may be first party and/or third party web extensions that use standard web technologies (e.g. XML, HTML, FLASH, JAVASCRIPT, . . . ) that are hosted by another server (e.g. 19) and associated with the spreadsheet application. Some gadgets may be integrated with a sheet's contents whereas other gadgets are separate from the sheet. The gadgets may be used online and/or offline with the spreadsheet and may be accessed through a link. A gadget is bound to a range of cells (one or more) within a sheet. When one or more of the cells of the bound range is accessed (e.g. selected, hovered over, edited, deleted, added), the gadget is notified. The gadget may use this information for updating a display rendered by the gadget and/or performing some other action. The gadget may render data obtained from the spreadsheet while the spreadsheet application protects the backend logic and calculation details in the spreadsheet itself to any unauthorized users viewing the gadget. The gadget uses an Application Programming Interface (API) 29 to communicate with the spreadsheet. The API 29 comprises functionality for binding the gadget to the spreadsheet, obtaining/putting content from/into the spreadsheet, changing a display of the spreadsheet, requesting a display of a spreadsheet user interface, and the like. According to an embodiment, the gadget is a Named Item object within the spreadsheet such that the gadget may be viewed/displayed differently from other objects (e.g. selected for electronic display/publication in a report, dashboard, . . . ). Out of date requests from the gadget are attempted to be detected and prevented from being processed such that the gadget is not acting on the latest data. Additional details regarding the operation of gadget manager 26 will be provided below.

Figure 2:
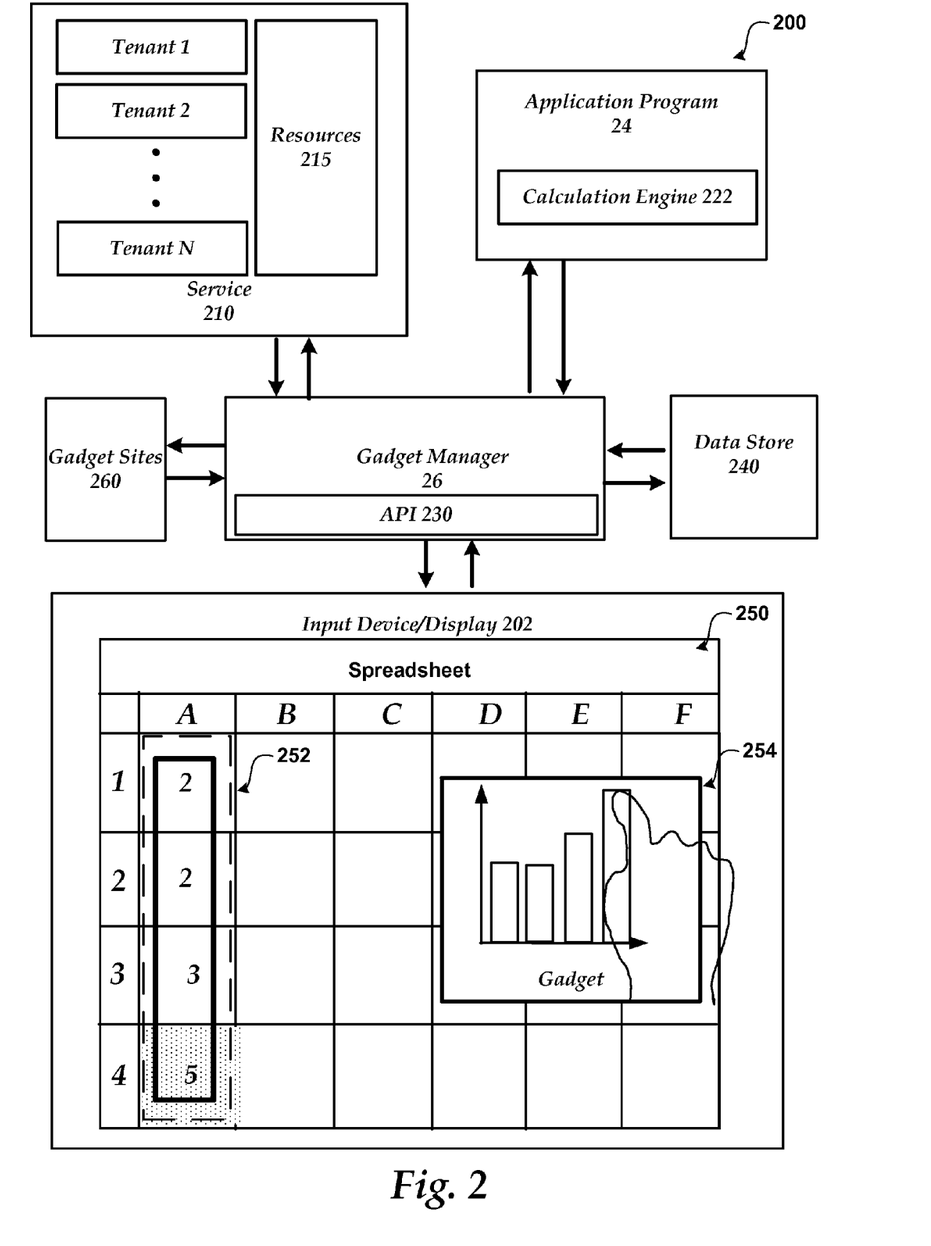
FIG. 2 illustrates an exemplary system integrating gadgets with a spreadsheet and spreadsheet calculation engine.

FIG. 2 illustrates an exemplary system integrating gadgets with a spreadsheet and spreadsheet calculation engine. As illustrated, system 200 includes application program 24, service 210, gadget manager 26, data store 240, gadget sites 260, and input device/display 202. According to an embodiment, display 202 is a touch screen device.

According to one embodiment, application program 24 is a spreadsheet application that is configured to receive input from a touch-sensitive input device 202. For example, gadget manager 26 may provide information to application 24 and/or service 210 in response to a user's finger (i.e. finger on hand 256) selection of a menu option, a gadget component (e.g. selecting a bar in an interactive bar chart), selection of one or more cells of a spreadsheet (e.g. spreadsheet 250), selection of a column/row in the spreadsheet (e.g. selection 252), and the like.

As illustrated, service 210 is a cloud based and/or enterprise based service that is configured to provide services relating to one or more productivity applications (e.g. MICROSOFT EXCEL, MICROSOFT SHAREPOINT). Service 210 may also be configured as a client based application. Although system 200 shows a productivity service and/or a content management service, other services/applications may be configured to use slicers with tabular data. The functionality of application program 24 may be included within service 210.

As illustrated, service 210 is a multi-tenant service that provides resources 215 and services to any number of tenants (e.g. Tenants 1-N). According to an embodiment, multi-tenant service 210 is a cloud based service that provides resources/services 215 to tenants subscribed to the service and maintains each tenant's data separately and protected from other tenant data. For example, service 210 may be configured to provide services corresponding to productivity applications (e.g. spreadsheet, content management, word processing, presentation, messaging . . . ), and the like.

Touch input system 200 as illustrated comprises a touch screen input device 202 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

Gadget manager 26 is configured to process the received touch input from touch screen 202. For example, a user may select one or more cells (e.g. selection 252) within spreadsheet 250 to bind with a gadget (e.g. gadget 254). In the current example, a user selected cells 252 to identify the range of cells to bind with gadget 254.

Gadgets comprise web content that may be configured in the same manner as other content on the web. Generally, gadgets are configured to display information at a glance and provide easy access to frequently used tools. For example, a gadget 254 may be created to display an interactive bar chart that may obtain data from the spreadsheet (e.g. from cells 252) as well as to place data within the spreadsheet. For example, a user may select a bar of the bar chart and drag the bar to a new value. In the example illustrated, a user has selected the bar on the far right that corresponds to the cell value at location A4. After the user has adjusted the bar, the value at A4 is updated by the gadget to the spreadsheet (e.g. the current value as determined by the gadget is 5). Not only can the gadget show content that is obtained from the spreadsheet, the gadget can cause the display of the spreadsheet to change. In the current example, when gadget 254 is shown, the cells associated with the gadget are distinguished from the other cells (e.g. a border around the associated cells, the cells highlighted, the formatting of the cells changing, and the like).

Gadgets may be configured to perform almost any desired operation. For example, the gadget may be configured to display stock quotes, update headline, display slide shows, interact with the spreadsheet data (e.g. setting values/obtaining values).

Gadgets may be built using different programming technologies, such as: XML, HTML, JavaScript, ADOBE FLASH, and the like. Gadgets may run on a network site (e.g. gadget web site 260), a local machine, and/or may be contained within the spreadsheet. The site may be hosted by a third party and/or hosted by service 210. The gadgets may be used online and/or offline with the spreadsheet and may be accessed through a link.

Gadgets integrate with spreadsheets and the spreadsheet calculation engine 222. Some gadgets may be integrated with a sheet's contents whereas other gadgets are separate from the sheet. As discussed, a gadget may be bound to a range of cells (one or more) within a sheet.

When one or more of the cells of the bound range is interacted with (e.g. selected, hovered over, edited, deleted, added), the gadget is notified. The gadget may use this information for updating a display rendered by the gadget and/or performing some other action.

The gadget uses an Application Programming Interface (API) 230 to communicate with the spreadsheet. The API 230 comprises functionality for binding the gadget to the spreadsheet, obtaining/putting content from/into the spreadsheet, changing a display of the spreadsheet, requesting a display of a spreadsheet user interface, and the like.

Gadgets are treated as an object of the spreadsheet along with the other objects of a spreadsheet (tables, charts, range, . . . ). According to an embodiment, the gadget may also be a Named Item object within the spreadsheet such that the gadget may be viewed/displayed differently from other objects (e.g. selected for publication in a report, dashboard, . . . ). (See FIG. 4 and related discussion).

The gadget is configured to communicate asynchronously with the spreadsheet. As such, a call from the gadget to the spreadsheet may be out of date (e.g. the data referred to by the call is not the current data). When a call is received that is out of date, the gadget is notified and the call is not processed such that the gadget is not acting on data which it may not be aware of.

Data store 240 may store spreadsheets that may be associated with one or more gadgets. The user may open a file/workbook from a user interface associated with the spreadsheet application and/or some other application.

A gadget may display data differently depending on a user's access permissions. For example, the spreadsheet may restrict access to data within the spreadsheet and/or the gadget may specify restrictions. For example, views that the user does not have access to are not shown within the gadget, but views the user does have access are displayed within the gadget. The gadget may render data obtained from the spreadsheet while the spreadsheet application protects the backend logic and calculation details in the spreadsheet itself to any unauthorized users viewing the gadget.

Figure 3:
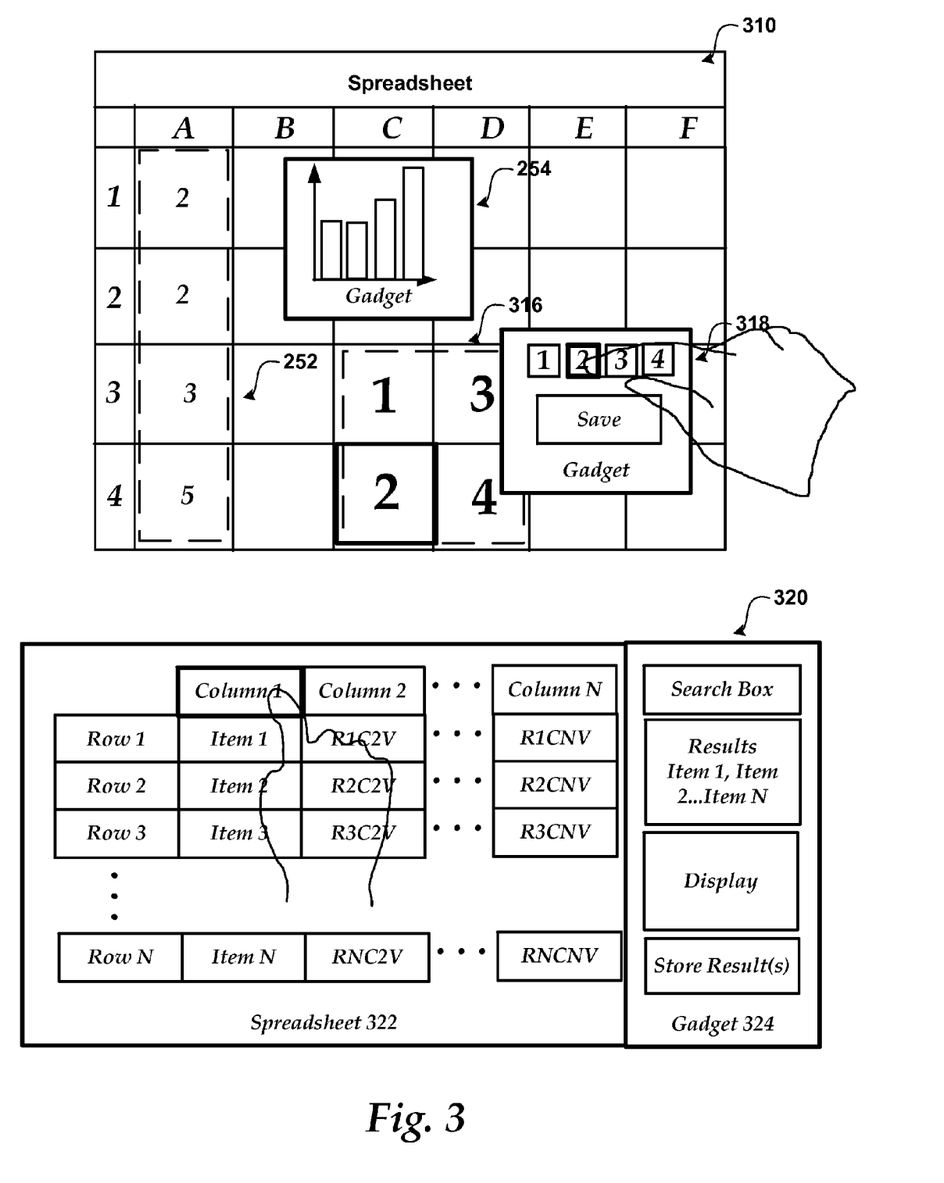
FIG. 3 shows an exemplary displays of gadgets and spreadsheets.

FIG. 3 shows an exemplary displays of gadgets and spreadsheets.

As illustrated, display 310 shows a spreadsheet that is associated with two gadgets, gadget 254 and gadget 318. Gadget 254 is the gadget as described in FIG. 2 and is bound to selected range 252.

Gadget 318 is a gadget that allows a user to display values and enter values into the spreadsheet. For example, gadget 318 shows entry boxes for entering values that may be placed within the spreadsheet. In the current example, the user has entered the values 1, 2, 3 and 4 for entry into the bound location 316 after the user selects the save option. In the current example, the gadget uses the API to adjust a view of the spreadsheet in response to a current selection of an entry box (e.g. the user is entering the value 2 in the entry box causing the corresponding cell location to be highlighted). The user may also change a value within the spreadsheet causing the gadget to redisplay and update the value. In other words, changes made to the gadget may be shown in the spreadsheet and changes made to the spreadsheet may be shown in the gadget.

Display 320 shows a spreadsheet 322 with a gadget 324 displayed in a task pane near the display of the spreadsheet. In the current example, gadget 324 is configured to search content obtained from outside of the spreadsheet and provide, display and store results from the search within the spreadsheet. For example, the gadget 324 may use on or more search services to search for source from one or more locations. A user may decide to store one or more of the returned results in spreadsheet 322. In response to a user selecting to store results by selecting the store results button, the spreadsheet may display a user interface selection method and/or place the user within a touch mode that allows a user to select where in the spreadsheet that they would like the results stored. For example, in response to an API call to allow touch input to select a location, the user selects column 1 as the location to store the content. In response to the selection, the spreadsheet returns the location to gadget 324 such that it may place the results within the determined location.

Figure 4:
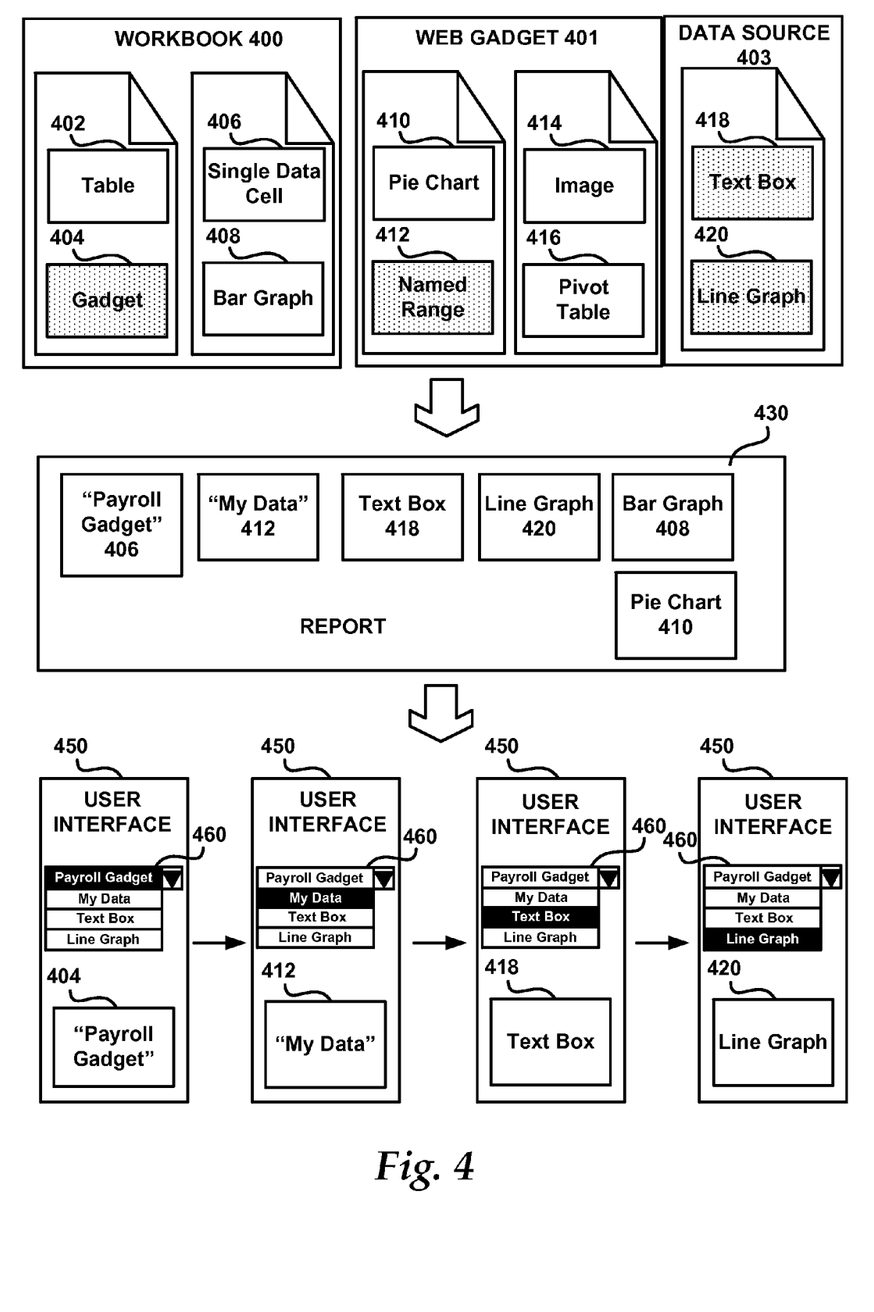
FIG. 4 is a functional block diagram illustrating the generation of a named object view report across multiple object sources including gadgets.

FIG. 4 is a functional block diagram illustrating the generation of a named object view report across multiple object sources including gadgets. The named object view of the report may be generated from different electronic object sources. As shown in the diagram, the electronic data object sources are obtained from a workbook, such as workbook 400, a gadget 401 and from data source 403. The electronic object sources, however, may be any file/data source that may be associated with an object. For example, one or more objects that are created from a web page, a common data source may be displayed within the named object view. The object may or may not be stored within an object source when it is obtained and displayed within a report. For example, the object may be a newly created object that is not yet stored within a electronic file, but is stored within a memory of a computing device.

Workbooks may include multiple objects on different sheets. The objects may be any item in the workbooks that can be individually selected or manipulated. For example, the objects in workbook 400 may include a table 402, a gadget 404, a single data cell 406 and a bar graph 408. Other objects may also be included within workbook 400. As illustrated, gadget 401 includes a pie chart 410, a named range 412, an image 414, and a pivot table 416. Data source 403 includes a text box 418, and a line graph 420. Some of the objects may use data from a common data source. For example, bar graph 408 in workbook 400, pie chart 410 in gadget 401, and line graph 420 from data source 403 may be created from the same data source. In one embodiment, an object may be defined to encompass multiple smaller objects. For example, an object may correspond to multiple pages of a workbook. In another embodiment, an object may include dynamic information such that the size of the object changes over time. For example, the named range 412 may correspond to a range of cells that are contained within a workbook (e.g. workbook 400 and/or some other workbook (not shown)). The range of cells may increase or decrease in size in response to spreadsheet processing. The named range may correspond to a range from other data sources. For example, a web page may contain a range of values that change over time.

The report may be generated automatically in response to an event (e.g. a user opening a workbook, selecting a Named Object View (NOV) option within a user interface, performing a search, and the like). For example, an author user or administrative user may access one or more of the workbook, web page, and/or a data source from a server to generate a report 430. Alternatively, a workbook, web page, and/or a data source may be accessed at a client. The objects to publish in the report may be automatically/manually selected. For example, the user may select all/portion of the objects to publish in the report. For example, the user may manually select gadget 404 in workbook 300, the named range 412 in gadget 401 and the text box 418 and the line graph 420 in data source 403 to appear in the report 430. Bar graph 408 and pie chart 410 may be automatically selected to be published as they are created using common data (e.g. the same data source). The user may open a file/workbook from a publisher interface. In one embodiment, names associated with the objects are provided in the publisher interface. The user may select the objects to publish from the list. In one embodiment, objects may be selected for publication from multiple workbooks.

The user may select the objects for inclusion in the report 430 by name such that each published object may be easily identified. In one embodiment, the published object names may be automatically generated. For example, the table 402 may be automatically identified as "table", "table1", or some other unique name. The user may rename the automatically generated name. In another embodiment, the user defines a name for the published object. For example, the gadget 404 may be defined as "Payroll Gadget". Likewise, the named range 412 may be defined as "my data".

The selected objects are published in the report 430. For example, the gadget ("Payroll Gadget") 406, the named range ("my data") 412, the text box 418, and the line graph 420 are published in the report 430. The unselected portions of the workbook 400, gadget 401 and data source 403 are not published in the report 430.

According to an embodiment, the object sources that utilize a same data source are searched to determine the objects to obtain from the object sources. For example, many object sources may create objects (e.g. tables, charts, graphs) using the same data source. In the current example, the bar graph 408 and pie chart 410 are created using the same data. A user may desire to see all of the objects created using the data source. The data source may be automatically/manually selected. For example, the data source(s) may be determined from the selected object(s) and/or the data source may be determined from input from a user (e.g. through a user interface element). The user may then select a NOV mode the user may view the selected objects by cycling through different views that are obtained from the data source.

Another example includes where users may view a web page and alter the data, creating unique and interesting views specific to their interpretation of the data. The users may want to share those views, especially in today's socially connected internet environment. In this example, assume that a user has friends who each have made multiple views using the data from the web page. Each of these friends may have one or more object sources (e.g. files) that are used to store the different views. One or more of the views may also be stored in a memory. When a report is generated to show a view created from the web page, the different object sources that include the views created by the different users may also be searched for the similar objects. The objects from the different object sources are obtained and are included in the report. When cycling through the various views of the objects, a user may see all of the different views without having to individually access each object source.

According to an embodiment, the permissions of the object sources are followed. Views that the user does not have access are not shown, but views the user does have access are displayed. For example, when a user is viewing a display from the Payroll Gadget 406 they will not have access to payroll views that they are not authorized to view (e.g. views of other users payroll information).

A user at the client is presented with a named object view of the report 430. According to an embodiment, the report does not distinguish where an object is obtained from. According to another embodiment, a user may query the object to determine where it is located. For example, a user may right click on a displayed object to find out its location and/or open the object and the associated object source from where it was obtained.

A report renderer converts the published objects into a Markup Language (ML) when requested. For example, one of the object sources (e.g. workbook 400) is accessed from a server. The ML version of the published objects is forwarded to a client for display via a web browser. In one embodiment, a published object is rendered on a user interface 450. For example, the user interface 450 may be a web part. A web part is a modular unit of information that has a single purpose. Web parts form the basic building blocks of many web pages. More than one web part may be simultaneously displayed on a dashboard at the client such that different published objects may be viewed side-by-side. For example, the user may select the text box 418 and the line graph 420 for display on different web parts because the text box 418 elaborates on data presented in the line graph 420.

A tool bar that includes the names of the published objects may also be rendered on the user interface 450. The tool bar may be used for accessing specific published objects. For example, the tool bar is a drop down menu 460 that includes a list of the names of the published objects. Specifically, the drop down menu 360 includes selectable entries for "Payroll Gadget", "my data", text box, and line graph. The other objects may also be included within the user interface. The named object view of the report is rendered on the user interface 550 with the first published object (i.e., "Payroll Gadget"). The other published objects may be rendered at the user interface 450 in response to user input. For example, the user may select an entry from the drop down menu 460 such that the user interface 450 refreshes and the published object corresponding to the selected entry is rendered on the user interface 450. Thus, each published object may be individually displayed to the user at the client. The named object view of the report focuses the user's attention on the published objects. The non-published objects of the object sources are not displayed to the user.

Figure 5:
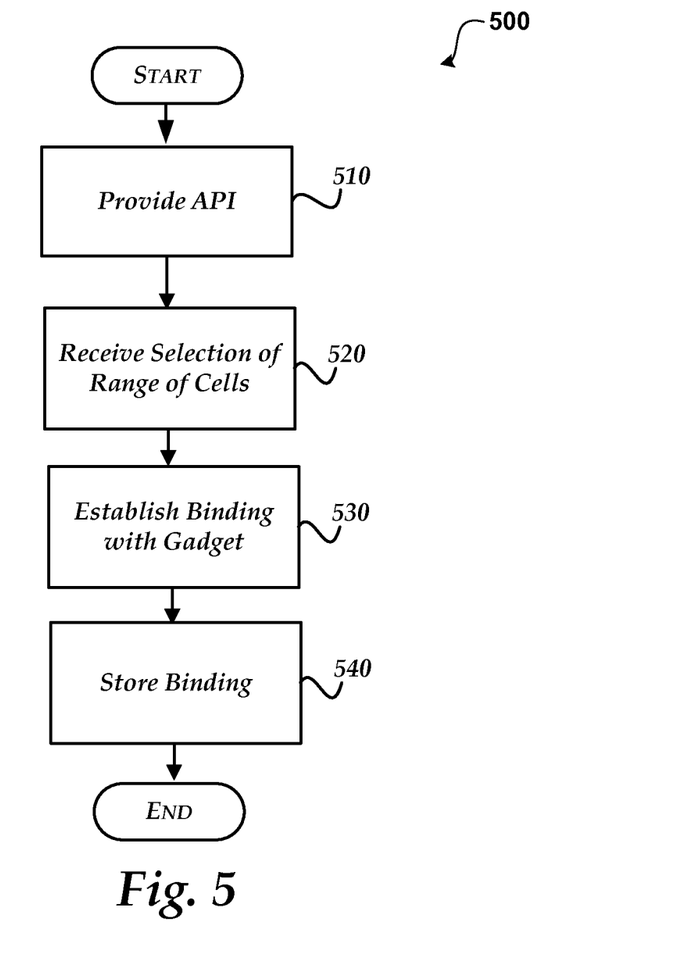
FIG. 5 shows a process for binding a gadget to a spreadsheet.
Figure 6:
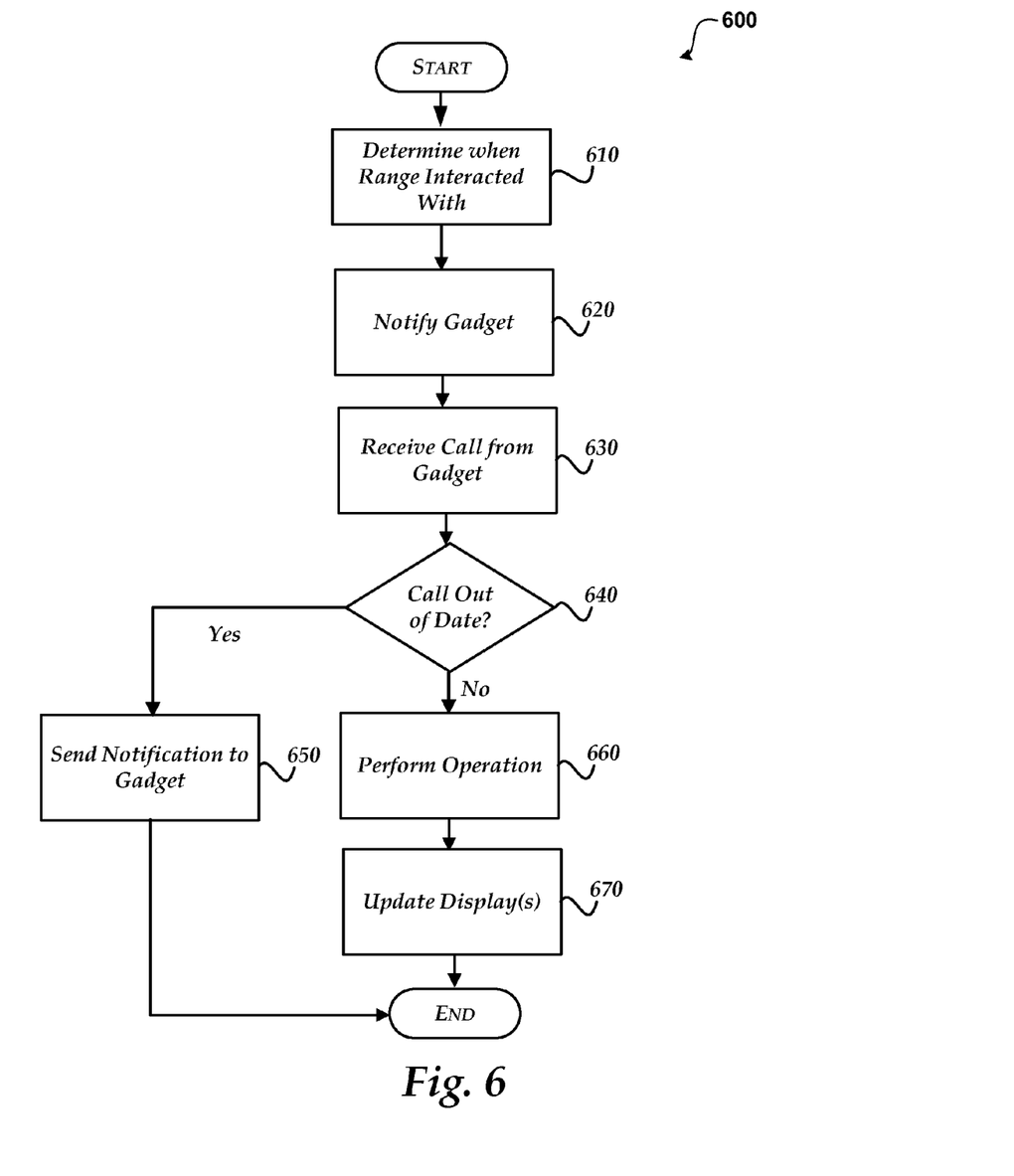
FIG. 6 shows a process for a gadget interacting with a spreadsheet.

Referring now to FIGS. 5 and 6, an illustrative process for creating and using gadgets with spreadsheets will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 5 shows a process for binding a gadget to a spreadsheet.

After a start operation, process 500 flows to operation 510, where an API is provided for interaction between the gadget and the spreadsheet. The API may provide a variety of functions. For example, the API may provide functions for: binding the gadget to the spreadsheet, obtaining/putting content from/into the spreadsheet, changing a display of the spreadsheet, requesting a display of a spreadsheet user interface, storing data associated with the gadget within the spreadsheet file but not in the cells of the spreadsheet, and the like.

Moving to operation 520, a range of cells is selected to bind to the gadget. The selection may be a user selection of one or more cells within a spreadsheet and/or a selection made through the API. For example, a user may select one or more cells of the spreadsheet using touch input, a user interface associated with the spreadsheet, and/or provide a name of an object, a range of cells (e.g. A1:A9, B1:F3, table 1, a name of a range, a name of an item, and the like) within a call associated with the API. According to an embodiment, the selection of the range uses touch input. For example, a user may perform a gesture to select one or more cells of a spreadsheet. Additionally, according to some embodiments, the user may only have to place their finger (or some other object) near the surface of the touch surface for touch input to be received and detected. The cells may include cells within one or more rows and one or more columns of the spreadsheet. The selection may be used to identify the range to bind with the gadget.

Transitioning to operation 530, the binding between the gadget and the spreadsheet is established. The binding may specify a unique name for the gadget, a link to the gadget, and the range of cells of the spreadsheet to be associated with the gadget.

Moving to operation 540, the binding information is stored. According to an embodiment, the binding information is stored within the spreadsheet such that when the spreadsheet file is copied, the gadget and binding information move with the copy. According to another embodiment, the binding may be stored at a different location such that the gadget is not part of the spreadsheet file.

The process then flows to an end operation and returns to processing other actions.

FIG. 6 shows a process for a gadget interacting with a spreadsheet.

After a start operation, process 600 flows to operation 610, where a determination is made as to when the range that is bound to the gadget is interacted with (e.g. one or more cells within the spreadsheet is selected, hovered over, edited, deleted, added).

Moving to operation 620, the gadget is notified of the interaction. According to an embodiment, the notification provides the gadget that the bound range has changed. The notification may include other information. For example, the notification may include the specified cell(s) that have been interacted with and/or the changed data.

Transitioning to operation 630, a call is received from the gadget. According to an embodiment, the call is received through an API call. As discussed herein, the call may relate to: binding the gadget to the spreadsheet, obtaining/putting content from/into the spreadsheet, changing a display of the spreadsheet, requesting a display of a spreadsheet user interface, and the like.

Moving to decision operation 640, a determination is made as to whether the request is out of date. For example, a change may have been made to the spreadsheet between a time when the gadget made the call and a time when the spreadsheet received the call. In another example, a spreadsheet application (e.g. at a network location) may have multiple users simultaneously editing a workbook. When the call is out of date, the process moves to operation 650. When the call is not out of date, the process flows to operation 660.

At operation 650, a notification is sent to the gadget that informs the gadget that the request is out of date and may not be associated with the most current data in the spreadsheet. In response to the notification, the gadget may obtain the latest data from the spreadsheet and resubmit the request and/or perform some other operation (e.g. cancel the operation).

At operation 660, the operation is performed. The operation may relate to a variety of different actions. For example, the operation may be obtaining/putting content from/into the spreadsheet, changing a display of the spreadsheet, requesting a display of a spreadsheet user interface, identifying the gadget for publishing, and the like.

Flowing to operation 670, the display(s) may be updated. The spreadsheet display may be updated and/or the gadget display may be updated.

The process then flows to an end operation and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system comprising:
   at least one processor; and
   memory encoding computer executable instructions that, when executed by at least one processor, cause the at least one processor to perform a method for integrating a gadget with a spreadsheet, the method comprising
   providing an Application Programming Interface (API) for the gadget to communicate with the spreadsheet;
   receiving a selection of a range of cells of the spreadsheet to bind to the gadget, wherein the selected range of cells comprises one or more cells of the spreadsheet;
   determining a binding between the selected range of cells of the spreadsheet and the gadget;
   determining an interaction with the selected range of cells;
   automatically providing a first notification to the gadget in response to the interaction;
   receiving a call from the gadget using the API;
   performing an operation involving the spreadsheet that relates to the received call;
   after performing the operation, receiving input to change the selected range of cells to adjust the binding to include the changed selected range of cells; and
   automatically providing a second notification to the gadget in response to the input.

2. The system of claim 1, wherein the gadget is configured to display interactive content associated with data within the selected range of cells.

3. The system of claim 2, further comprising in response to an interaction with the interactive content, updating the data within the selected range of cells.

4. The system of claim 2, wherein the interactive content is displayed based on access permissions associated with the spreadsheet.

5. The system of claim 1, wherein the API is configured to at least obtain content from one or more cells of the spreadsheet, place content into one or more cells of the spreadsheet, create a binding between the gadget and a selected range of cells of the spreadsheet, and changing a display of the spreadsheet.

6. The system of claim 1, further comprising storing the binding within the spreadsheet.

7. The system of claim 1, wherein the binding between the selected range of cells of the spreadsheet and the gadget specifies a unique name for the gadget, a link to the gadget, and a range of cells of the spreadsheet to be associated with the gadget.

8. The system of claim 1, further comprising exposing the gadget as a named item within the spreadsheet such that the gadget is publishable in a report.

9. The system of claim 1, further comprising displaying both the spreadsheet and the gadget, wherein the selected range of cells are distinguished from other cells displayed in the spreadsheet.

10. The system of claim 1, wherein the interaction with the selected range of cells includes at least one of deleting a cell within the selected range of cells, adding a cell within the selected range of cells, editing a cell within the selected range of cells, hovering over a cell within the selected range of cells, and selecting a cell within the selected range of cells is selected.

11. A method for integrating a gadget with a spreadsheet, comprising:
   providing an Application Programming Interface (API) for the gadget to communicate with the spreadsheet;
   receiving a selection of a range of cells of the spreadsheet to bind to the gadget, wherein the selected range of cells comprises one or more cells of the spreadsheet;
   determining a binding between the selected range of cells of the spreadsheet and the gadget;
   determining an interaction with the selected range of cells;
   automatically providing a first notification to the gadget in response to the interaction;
   receiving a call from the gadget using the API;
   performing an operation involving the spreadsheet that relates to the received call;
   after performing the operation, receiving input to change the selected range of cells to adjust the binding to include the changed selected range of cells; and
   automatically providing a second notification to the gadget in response to the input.

12. The method of claim 11, further comprising in response to providing the first notification to the gadget, performing an action.

13. The method of claim 12, wherein the action comprises updating a display of the gadget.

14. The method of claim 11, further comprising exposing the gadget as a named item within the spreadsheet such that the gadget can be displayed differently from other objects within the spreadsheet.

15. The method of claim 11, wherein the API further comprises a function for changing the display of one or more cells of the spreadsheet in response to an action occurring on the gadget.

16. The method of claim 11, wherein the binding is automatically updated in response to the input.

17. The method of claim 1, further comprising determining when the call is out of date, wherein when it is determined that the call is out of date, preventing the call from being executed.

18. A system comprising
at least one processor; and
memory encoding computer executable instructions that, when executed by at least one processor, cause the at least one processor to perform a method comprising
providing an Application Programming Interface (API) for a gadget to communicate with a spreadsheet;
receiving a selection of a range of cells of the spreadsheet to bind to the gadget, wherein the selected range of cells comprises one or more cells of the spreadsheet;
establishing a binding between the selected range of cells of the spreadsheet and the gadget;
receiving input to change the selected range of cells to adjust the binding to include the changed selected range of cells; and
automatically providing a notification to the gadget in response to the input.

19. The system of claim 18, further comprising automatically generating a report for the gadget in response to an event.

20. The system of claim 19, wherein the event includes one of opening the spreadsheet, selecting a Named Object View option or performing a search.

* * * * *